US006954310B2

(12) United States Patent
Holloway et al.

(10) Patent No.: US 6,954,310 B2
(45) Date of Patent: Oct. 11, 2005

(54) HIGH RESOLUTION MULTI-LENS IMAGING DEVICE

(75) Inventors: Paul H. Holloway, Gainesville, FL (US); Mark R. Davidson, Florahome, FL (US); Olga Alexander Shenderova, Raleigh, NC (US); Gary E. McGuire, Carrboro, NC (US); David B. Tanner, Gainesville, FL (US); Arthur Hebard, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/670,679

(22) Filed: Sep. 25, 2003

(65) Prior Publication Data

US 2005/0068632 A1  Mar. 31, 2005

(51) Int. Cl.[7] .................. G02B 27/10; G02B 21/36; G02B 13/16; H04N 5/225
(52) U.S. Cl. .................. 359/619; 359/363; 348/335
(58) Field of Search ................. 359/355–357, 359/362–363, 618–620, 626, 664, 708, 725, 359/738; 348/36, 159, 164, 335; 250/505.1; 378/84

(56) References Cited

U.S. PATENT DOCUMENTS 5,023,725 A * 6/1991 McCutchen ............ 359/363
5,272,332 A   12/1993 Ning
5,982,549 A   11/1999 Kubala et al.
6,002,430 A * 12/1999 McCall et al. ......... 348/335
6,545,702 B1   4/2003 Konolige et al.

OTHER PUBLICATIONS

"Digital Mapping Camera System", Z/I Imaging, 2003. p. 1-14 Mar. 2003.
"Focusing Soft X-Rays with Photon Sieves", Nature, vol. 414, pp. 184-188, 2001.
"Digial Modular Camera: System Concept and Data Processing Workflow," Alexander Hinz, Christoph Dörstel, Helmut Heier. IAPRS, vol. XXXIII, Amsterdam. Z/I Imaging, GmbH. Oberkochen, Germany 2000.

* cited by examiner

Primary Examiner—Georgia Epps
Assistant Examiner—Alicia M Harrington
(74) Attorney, Agent, or Firm—Akerman Senterfitt

(57) ABSTRACT

An imaging device (30) can include a plurality of lenses (51, 52, 53, 54) mounted on a multi-dimensional support structure (32), a plurality of optical detectors (40) corresponding to the plurality of lenses for capturing an optical signal from at least two lenses among the plurality of lenses, and a processor (34) for combining the optical signal from at least two lenses to form an image and electronically controlling the field of view and a resolution of the image. The plurality of lenses each can include an array of sub-wavelength apertures or a plurality of photon sieve lenses (36).

21 Claims, 3 Drawing Sheets

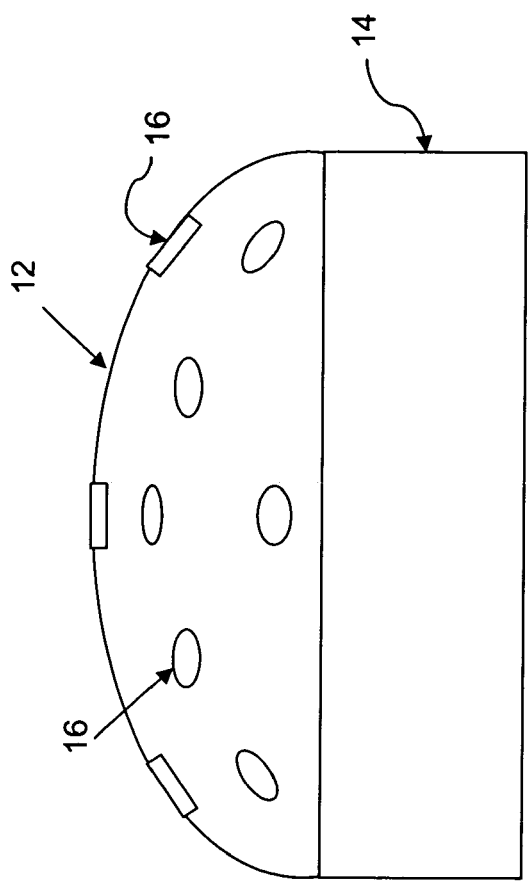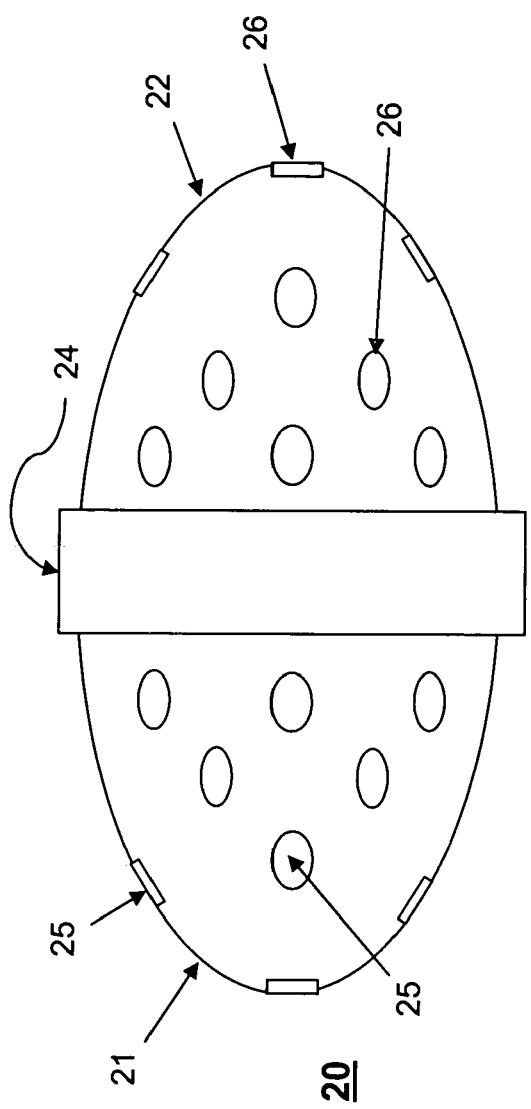

100

HIGH RESOLUTION MULTI-LENS IMAGING DEVICE

STATEMENT REGARDING FEDERALLY SPONSORED RESEARCH OR DEVELOPMENT

The United States Government has rights to this invention pursuant to Grant No. N000140310418 from the Office of Naval Research.

BACKGROUND OF THE INVENTION

1. Technical Field

This invention relates to the field of imaging and more particularly to imaging using multiple lenses.

2. Description of the Related Art

Digital Modular Cameras (DMC) by Z/I Imaging (a joint venture between Carl Zeiss and Intergraph) currently provide accurate high resolution images using multi-lens cameras and a corresponding matrix of charge coupled devices (CCD). The DMC comprises a variable number of synchronously operating CCD-matrix based cameras that can be mounted together in different configurations, depending on the application. The multi-camera approach allows the combination of high panchromatic resolution with multi-spectral capability. The idea to enlarge the field of view by combining several lens systems is well known since the early days of aerial photography using conventional refractive optics. Several Aerial Cameras with multiple lenses were built, but complicated special rectifiers and plotting instruments were developed to restore the image geometry. Handling of the image and the accompanying instruments was troublesome and eventually obviated the use of multi-lens cameras by the development of new single-lens cameras with larger negative formats. Now, however, the image restoration of such a multi-lens camera can be done completely by photogrammetric software.

Even with such dramatic improvements in photogrammetry, additional improvements in providing more flexible options in terms of field of view and resolution would be a welcome feature for both military and consumer applications.

SUMMARY OF THE INVENTION

An imaging system allowing electronic changes from large to small field of view, with a concomitant change from a low resolution to a high resolution is described. The additional use of photon sieves for lenses can provide better focusing in the high resolution configuration of a small, light weight package (although the present invention is not necessarily limited to small and light weight packages).

In a first aspect of the invention, an imaging device can include a plurality of lenses mounted on a three dimensional support structure in substantially a spherical, elliptical, or hemispherical shape, a plurality of optical detectors such as charge coupled devices (CCD) or complementary metal-oxide-semiconductors (CMOS) corresponding to the plurality of lenses for capturing an optical signal from at least two lenses among the plurality of lenses, means for combining the optical signal from at least two lenses, and means for generating an image with at least one among a variable field of view and a variable resolution. The means for combining and the means for generating can be a processor programmed to generate the image with a variable field of view and a variable resolution or a substrate having circuitry thereon for image integration and processing of a plurality of output signals from the plurality of optical detectors. The plurality of lenses can be a plurality of photon sieve lenses and the field of view for each lens in the plurality of lenses can overlap each other. The plurality of lenses can each include an array of sub-wavelength apertures (such as pin holes in a photon sieve lens) and the transmission can be enhanced by a relief structure around the holes for the photon sieve or ringlet structures or other structure about each of the apertures of the array.

In a second aspect of the invention, an imaging device can include a plurality of lenses mounted on a multi-dimensional support structure, a plurality of optical detectors corresponding to the plurality of lenses for capturing an optical signal from at least two lenses among the plurality of lenses, and a processor for combining the optical signal from at least two lenses to form an image and electronically controlling the field of view and a resolution of the image. The plurality of lenses each can include an array of sub-wavelength apertures or a plurality of photon sieve lenses.

In a third aspect of the invention, a method of forming a compound lens comprises the steps of mounting a plurality of lenses on a multi-dimensional support structure, capturing an optical signal from at least two lenses among the plurality of lenses using a plurality of optical detectors corresponding to the plurality of lenses for combining the optical signal from at least two lenses to form a single image, and generating an image with at least one among a variable field of view and a variable resolution. It should be understood that the term "corresponding" with regarding to optical detectors corresponding to the plurality of lenses does not necessarily mean a 1 to 1 correspondence since multiple lenses can share a single detector (or a single lens could share multiple detectors). The step of generating the image can include the step of generating the single image with both the variable field of view and the variable resolution using a photon sieve. The method can further include the step of electronically controlling the field of view and the resolution of the compound lens.

BRIEF DESCRIPTION OF THE DRAWINGS

There are shown in the drawings embodiments which are presently preferred, it being understood, however, that the invention is not limited to the precise arrangements and instrumentalities shown.

FIG. 1 is a block diagram of a multi-lens camera in accordance with the present invention.

FIG. 2 is a block diagram of another multi-lens camera in accordance with the present invention.

DETAILED DESCRIPTION OF THE INVENTION

Figure 3:
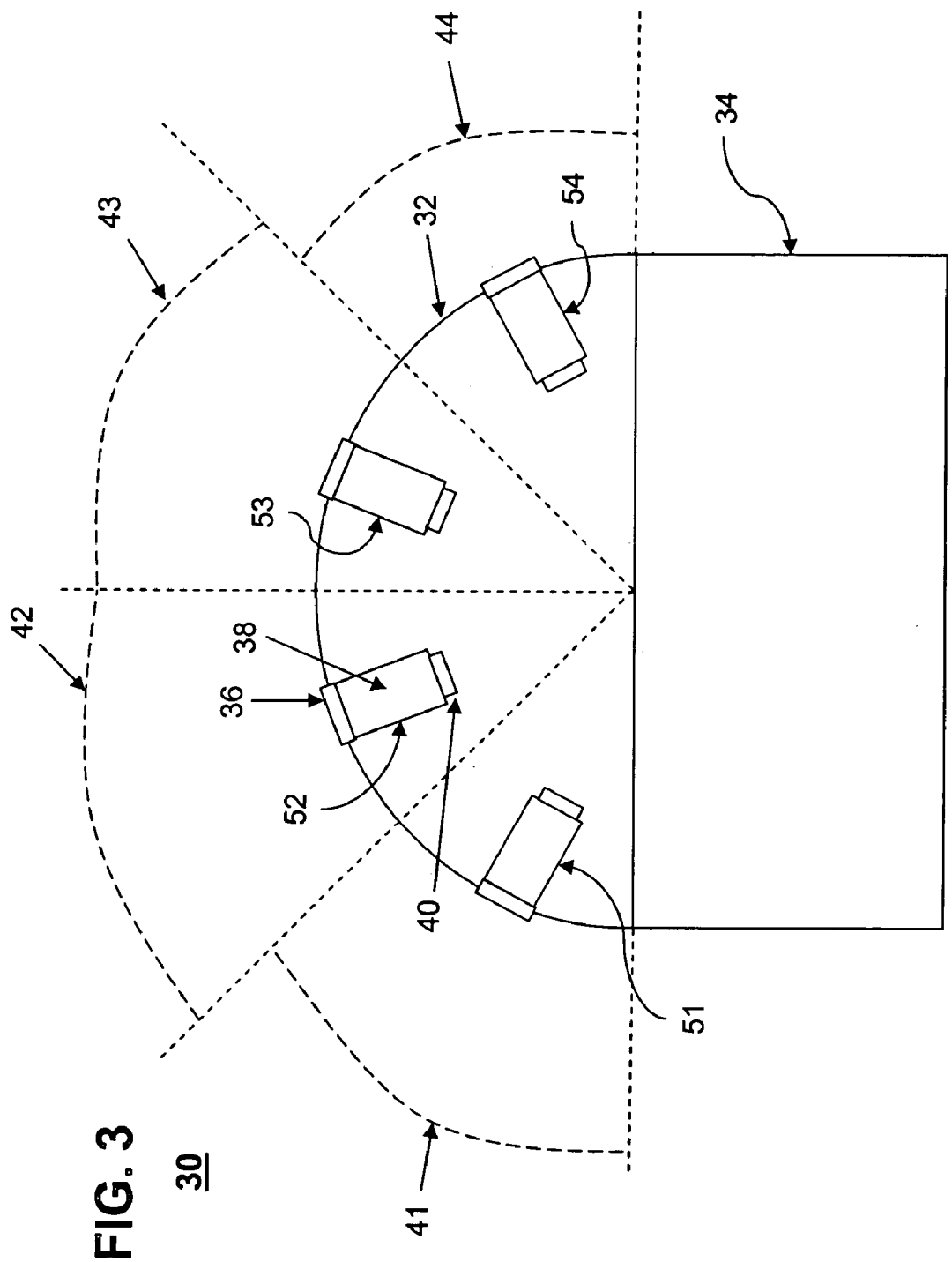
FIG. 3 is a block diagram of a yet another multi-lens camera in accordance with the present invention.

Referring to FIG. 1, a camera 10 is shown having a plurality of lenses 16 on a hemispherical support structure 12. Each of the plurality of lenses can have an associated optical detector as will be shown in FIG. 3. Each of the images from the plurality of lenses and corresponding detectors can be processed by electronics and/or software residing on substrate 14. The camera 10 can provide a 180 degree field of view. Another camera 20 shown in FIG. 2 can provide a 360 degree field of view. The camera 20 can include a first substantially hemispherical (or egg-shaped or elliptical) support structure 21 having a plurality of lenses 25 and a second support structure 22 having a plurality of lenses 26. As with camera 10, camera 20 can also have a plurality of corresponding optical detectors (not shown). Each of the images from the plurality of lenses and corresponding detectors can be processed by electronics and/or software residing on substrate 24. Note that the lenses shown in the embodiments herein preferably use diffractive optics.

Figure 4:
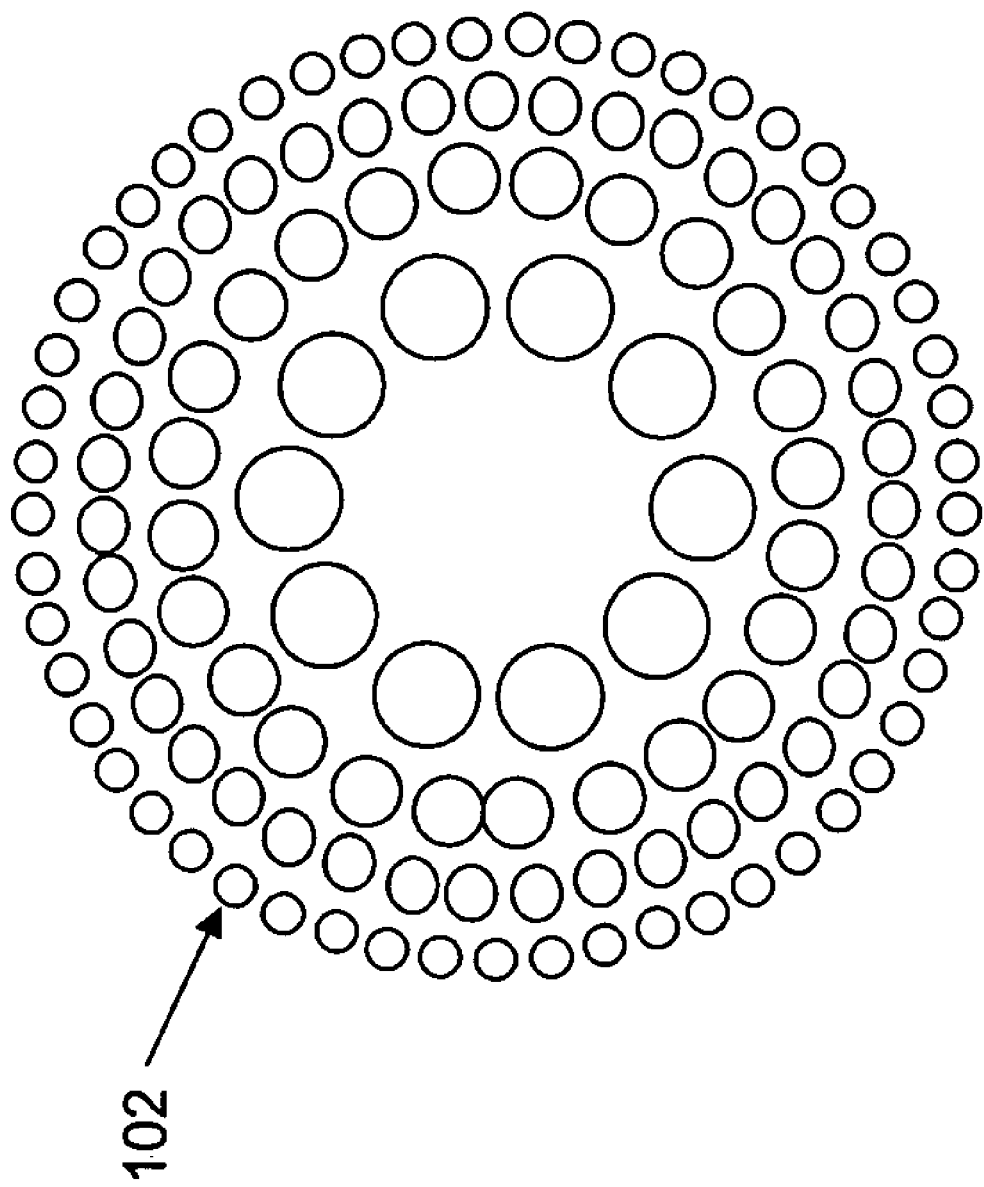
FIG. 4 is a schematic diagram of a photon sieve in accordance with an embodiment of the present invention.

Referring to FIG. 3, another camera 30 is shown using several lenses (51, 52, 53 54) to form a "complex eye" or a "fly's eye" on or within a support structure 32. As with the previous embodiments discussed above, the support structure 32 is preferably hemispherical in shape, but other shapes such as spherical, elliptical, and even flat shapes are contemplated within the scope of the invention. A flat fly's eye can be made for example by having each lens looking in the same direction, but with different magnification. In that instance, the arrangement of lenses will have a 2 dimensional structure rather than three dimensional structures shown in FIGS. 1–3. Each lens (51–54) can have a corresponding field of view 41, 42, 43, and 44. Additionally, each lens can have a photon sieve lens 36, an optical pathway 38 (either a hollow cylinder or transparent medium) and an optical detector 40 such as a photo detector. The plurality of lenses can each include an array of sub-wavelength apertures 102 (such as pin holes in a photon sieve lens 100 shown in FIG. 4). The optical prototype of the photon sieve contains pinholes of varying sizes to diffract light or X-rays to a small focus. The lens 36 can also have relief structures, ringlet structures, or other structures about each or some of the apertures of the array for enhanced transmission of light. In fact, the transmission through a single hole is boosted significantly by the presence of a dimple array on the surface, compared to the transmission of a hole in a smooth film.

Operationally, images of an object (not shown) can be captured and detected by one or more of the lenses (51–54) and consequently integrated and processed by the electronic image integration and processing unit 34.

The present invention can be realized in hardware or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

This invention can be embodied in other forms without departing from the spirit or essential attributes thereof. Accordingly, reference should be made to the following claims, rather than to the foregoing specification, as indicating the scope of the invention.

What is claimed is:

1. An imaging device, comprising:
   a plurality of lenses mounted on a multi-dimensional support structure, wherein each lens in the plurality of lenses has a field of view;
   at least one optical detector for capturing an optical signal from at least two lenses among the plurality of lenses and converting each optical signal to an electrical signal;
   means for combining the electrical signals; and
   means for generating an image with at least one among a variable field of view and a variable resolution;
   wherein the plurality of lenses comprises a plurality of photon sieve lenses.

2. The imaging device of claim 1, wherein the means for combining and the means for generating comprises a processor.

3. The imaging device of claim 2, wherein the processor is programmed to generate the image with a variable field of view and a variable resolution.

4. The imaging device of claim 1, wherein the means for combining further comprises a substrate having circuitry thereon for image integration and processing of a plurality of output signals from the plurality of optical detectors.

5. The imaging device of claim 1, wherein the at least one optical detector comprises a plurality of optical detectors.

6. The imaging device of claim 1, wherein the multi-dimensional support is formed substantially in the shape of at least one among a flat surface, a hemisphere, an elliptical shape, and a sphere.

7. The imaging device of claim 1, wherein each of the plurality of optical detectors comprises at least one among a charge coupled device and a complementary metal-oxide-semiconductor device.

8. The imaging device of claim 1, wherein the field of view for each lens in the plurality of lenses overlaps each other.

9. The imaging device of claim 1, wherein the plurality of lenses each comprises an array of sub-wavelength apertures and relief structures about each of the apertures of the array for enhanced transmission of light.

10. The imaging device of claim 1, wherein the plurality of lenses use diffractive optics.

11. An imaging device, comprising:
    a plurality of lenses mounted on a multi-dimensional support structure, wherein each lens in the plurality of lenses has a field of view;
    at least one optical detector for capturing an optical signal from at least two lenses among the plurality of lenses and converting each optical signal to an electrical signal; and
    a processor for combining the electrical signals to form an image and electronically controlling the field of view and a resolution of the image;
    wherein the plurality of lenses comprises a plurality of photon sieve lenses.

12. The imaging device of claim 11, wherein the plurality of lenses each comprises an array of sub-wavelength apertures.

13. The imaging device of claim 11, wherein the multi-dimensional support is formed substantially in the shape of at least one among a flat surface, a hemisphere, an elliptical shape, and a sphere.

14. The imaging device of claim 11, wherein each of the plurality of optical detectors comprises at least one among a charge coupled device and a complementary metal-oxide-semiconductor device.

15. The imaging device of claim 11, wherein the field of view for each lens in the plurality of lenses overlaps each other.

16. A method of forming an image, comprising the steps of:
    mounting a plurality of lenses on a multi-dimensional support structure, wherein each lens in the plurality of lenses comprises a plurality of photon sieve lenses;

capturing an optical signal from at least two lenses among the plurality of lenses using a plurality of optical detectors corresponding to the plurality of lenses for combining the optical signal from at least two lenses to form a single image; and generating an image with at least one among a variable field of view and a variable resolution.

17. The method of claim 16, wherein the step of generating the image comprises the step of generating the single image with both the variable field of view and the variable resolution.

18. The method of claim 16, wherein the method further comprises the step of electronically controlling the field of view and the resolution of the compound lens.

19. The imaging device of claim 16, wherein the plurality of lenses use diffractive optics.

20. An imaging device, comprising:

a plurality of leases mounted on a multi-dimensional support structure, wherein each lens in the plurality of lenses has a field of view;

at least one optical detector for capturing an optical signal from at least two lenses among the plurality of lenses and converting each optical signal to an electrical signal;

means for combining the electrical signals; and means for generating an image with at least one among a variable field of view and a variable resolution;

wherein the plurality of lenses each comprises an array of sub-wavelength apertures and relief structures about each of the apertures of the array for enhanced transmission of light.

21. An imaging device, comprising:

a plurality of lenses mounted on a multi-dimensional support structure, wherein each lens in the plurality of lenses has a field of view;

at least one optical detector for capturing an optical signal from at least two lenses among the plurality of lenses and converting each optical signal to an electrical signal; and a processor for combining the electrical signals to form an image and electronically controlling the field of view and a resolution of the image;

wherein the plurality of lenses each comprises an array of sub-wavelength apertures.

* * * * *